(12) United States Patent
Niiho et al.

(10) Patent No.: US 8,311,414 B2
(45) Date of Patent: Nov. 13, 2012

(54) OPTICAL SPACE TRANSFER APPARATUS USING IMAGE SENSOR

(75) Inventors: Tsutomu Niiho, Osaka (JP); Hiroyuki Sasai, Osaka (JP); Mariko Nakaso, Osaka (JP)

(73) Assignee: Panasonic Corporation, Osaka (JP)

( * ) Notice: Subject to any disclaimer, the term of this patent is extended or adjusted under 35 U.S.C. 154(b) by 615 days.

(21) Appl. No.: 12/373,852

(22) PCT Filed: Aug. 10, 2007

(86) PCT No.: PCT/JP2007/065731
§ 371 (c)(1),
(2), (4) Date: Jan. 14, 2009

(87) PCT Pub. No.: WO2008/023583
PCT Pub. Date: Feb. 28, 2008

(65) Prior Publication Data
US 2009/0317088 A1   Dec. 24, 2009

(30) Foreign Application Priority Data

Aug. 21, 2006  (JP) ................................. 2006-224288

(51) Int. Cl.
*H04B 10/00* (2006.01)
(52) U.S. Cl. ...................................................... 398/129
(58) Field of Classification Search .................. 398/132, 398/123, 129, 212, 131, 138; 372/26
See application file for complete search history.

(56) References Cited

U.S. PATENT DOCUMENTS

| | | | | |
|---|---|---|---|---|
| 5,262,871 | A | * | 11/1993 | Wilder et al. ................. 348/307 |
| 5,592,320 | A | * | 1/1997 | Wissinger ..................... 398/121 |
| 7,110,678 | B2 | * | 9/2006 | Willebrand et al. .......... 398/115 |
| 7,391,975 | B2 | * | 6/2008 | Oettinger et al. ............. 398/129 |

FOREIGN PATENT DOCUMENTS

| | | |
|---|---|---|
| JP | 6-95658 | 11/1994 |
| JP | 8-204641 | 8/1996 |
| JP | 10-22918 | 1/1998 |
| JP | 11-305892 | 11/1999 |
| JP | 2001-292107 | 10/2001 |
| JP | 2007-68108 | 3/2007 |
| JP | 2007-82098 | 3/2007 |

OTHER PUBLICATIONS

International Search Report issued Sep. 18, 2007 in International (PCT) Application No. PCT/JP2007/065731 of which the present application is the U.S. National Stage.

* cited by examiner

*Primary Examiner* — Yuanda Zhang
*Assistant Examiner* — Tuan Nguyen
(74) *Attorney, Agent, or Firm* — Wenderoth Lind & Ponack, L.L.P.

(57) ABSTRACT

A transmission device includes a first light emission unit having a light source for emitting one optical signal. A reception unit includes an X-Y address system image sensor, having a pixel region including a plurality of pixels, for receiving the optical signal by the pixel region; a classification unit for creating classification information representing a pixel group including pixels, among the plurality of pixels, which are irradiated with the optical signal; and a control unit for controlling the X-Y address system image sensor in accordance with the classification information to simultaneously read signals of the pixels belonging to the pixel group.

24 Claims, 12 Drawing Sheets

GROUPS: #6, #7, #10, #11

FIG. 9

IRRADIATION RANGE OF SETTING OPTICAL SIGNAL A

IRRADIATION RANGE OF SETTING OPTICAL SIGNAL B

105

| #1 | #2 | #3 | #4 | #5 | #6 | #7 | #8 |
|---|---|---|---|---|---|---|---|
| #9 | #10 | #11 | #12 | #13 | #14 | #15 | #16 |
| #17 | #18 | #19 | #20 | #21 | #22 | #23 | #24 |
| #25 | #26 | #27 | #28 | #29 | #30 | #31 | #32 |
| #33 | #34 | #35 | #36 | #37 | #38 | #39 | #40 |
| #41 | #42 | #43 | #44 | #45 | #46 | #47 | #48 |
| #49 | #50 | #51 | #52 | #53 | #54 | #55 | #56 |
| #57 | #58 | #59 | #60 | #61 | #62 | #63 | #64 |

IRRADIATION RANGE OF SETTING OPTICAL SIGNAL C

IRRADIATION RANGE OF SETTING OPTICAL SIGNAL D

GROUP A: #10, #11, #18, #19
GROUP B: #14, #15, #22, #23
GROUP C: #42, #43, #50, #51
GROUP D: #46, #47, #54, #55

OPTICAL SPACE TRANSFER APPARATUS USING IMAGE SENSOR

BACKGROUND OF THE INVENTION

1. Technical Field

The present invention relates to an optical space transfer apparatus realizing high speed optical space transfer using an image sensor.

2. Background Art

An optical space transfer system is capable of realizing high speed data transfer without using an optical fiber, and therefore is used for communication between buildings or as a part of wiring inside a building. The optical space transfer system is also capable of transferring a plurality of optical signals as being spatially separated from one another, and therefore does not need light sources or wavelength filters for different wavelengths, unlike a wavelength multiplex system used in optical fiber communication. Owing to these features, the optical space transfer system can use, for example, a laser which is not selected for any specific wavelength, an LED having a wide light emitting spectrum as a light source or the like. As a result, the optical space transfer system can realize high speed data transfer at low cost.

FIG. 13 shows a structure of a conventional optical space transfer apparatus 300 described in Patent document 1. As shown in FIG. 13, the optical space transfer apparatus 300 includes a transmission device 301 and a reception device 302. The transmission device 301 includes a serial-parallel conversion unit (hereinafter, referred to as an "S-P conversion unit") 303 for converting input serial format data into parallel format data (hereinafter, such conversion will be referred to as "S-P conversion") and a light emission unit 304 including a plurality of light sources. The reception device 302 includes a lens 305, a PD array unit 306 including a plurality of photodiodes (hereinafter, referred to as "PDs") arranged in a matrix, and a parallel-serial conversion unit (hereinafter, referred to as a "P-S conversion unit") 307 for converting input parallel format data into serial format data (hereinafter, such conversion will be referred to as "P-S conversion").

The S-P conversion unit 303 performs S-P conversion on input transfer data. Parallel format data obtained as a result of P-S conversion is input to the light emission unit 304. Parallel format data includes a plurality of pieces of data (hereinafter, referred to as "parallel data"). The light emission unit 304 inputs each piece of parallel data to a corresponding one of the light sources and emits an optical signal from each light source. In FIG. 13, four pieces of parallel data are respectively input to four light sources, and four optical signals are emitted. The lens 305 collects the optical signals emitted from the light sources of the light emission unit 304 to the PD array unit 306. The PD array unit 306 converts the optical signal directed to irradiate each PD into an electric signal (hereinafter, such conversion will be referred to as "opto-electric conversion"). Each of the PDs of the PD array unit 306 outputs an electric signal obtained by opto-electric conversion. Thus, an output from the PD array unit 306 includes a plurality of pieces of parallel data. The P-S conversion unit 307 performs P-S conversion on the input plurality of pieces of parallel data to reproduce serial format data.

As described above, the optical space transfer apparatus 300 performs optical space transfer after converting serial format data into parallel format data, and thus realizes high speed transfer.

However, the optical space transfer apparatus 300 using the PD array has the following problems. First, the reception device 302 needs to perform P-S conversion and so is required to include the P-S conversion unit 307. As a result, the circuit scale is enlarged. Second, in the case where the number of the PDs included in the PD array unit 306 is equal to the number of the light sources included in the light emission unit 304, the light sources and the PDs need to correspond one to one. Therefore, precise optical axis adjustment is necessary.

As an apparatus for solving these problems, a conventional optical space transfer apparatus 400 shown in FIG. 14 is conceived. As shown in FIG. 14, the optical space transfer apparatus 400 includes a reception device 401 in place of the reception device 302 included in the optical space transfer apparatus 300. The reception device 401 includes an X-Y address image sensor (hereinafter, referred to simply as an "image sensor") 402. An "X-Y address image sensor" is an image sensor of a system, by which pixels from which signals are to be read are sequentially specified by an address in an X direction and an address in a Y direction and signals at the specified pixels are sequentially read. Namely, the optical space transfer apparatus 400 includes the X-Y address image sensor 402 in place of the PD array unit 306 and the P-S conversion unit 307 included in the optical space transfer apparatus 300. In FIG. 14, the reception device 401 does not include the lens 305, but the reception device 401 may include the lens 305.

Now, an operation of the optical space transfer apparatus 400 will be described. The operation of the transmission device 301 is already described above and will not be described again. An optical signal emitted by each light source of the light emission unit 304 is directed to irradiate a pixel region of the image sensor 402 in which a plurality of pixels are arranged in a matrix. The image sensor 402 sequentially reads the signals received from the respective pixels to reproduce serial format data.

As described above, the optical space transfer apparatus 400 includes the image sensor 402 and so does not need to include the P-S conversion unit 307. Therefore, an increase of the circuit scale can be suppressed. In addition, the optical space transfer apparatus 400 can alleviate the required degree of precision of optical axis adjustment by increasing the number of pixels of the image sensor 402 irradiated with the optical signals and thus increasing the surface area of the pixel region, which is a light receiving region.

Patent document 1: Japanese Laid-Open Patent Publication No. 2001-292107

However, the above-described conventional optical space transfer apparatus 400 has the following problems. The image sensor 402 is usually used for imaging. The image sensor 402 sequentially reads a signal of each of pixels. As a result, the signals of all the pixels are read, and thus one image is read. FIG. 15 illustrates an operation of the image sensor 402 for reading a signal of each pixel. As shown in FIG. 15, the image sensor 402 includes a vertical scanning circuit 403, a horizontal scanning circuit 404, pixels #1 through #16, and an output signal line 405. The number of the pixels is merely one example. The image sensor 402 selects the pixels one by one by the vertical scanning circuit 403 and the horizontal scanning circuit 404, and sequentially reads the signals of the selected pixels to the output signal line 405. More specifically, all the pixels #1 through #16 are sequentially selected and the signals of all the pixels #1 through #16 are sequentially read to the output signal line 405. By this operation, the image sensor 402 outputs the optical signals directed to irradiate the pixel region as one image signal. Therefore, it requires a relatively long time to read the signals of all the pixels. Namely, the reading speed of the image sensor 402 included in the reception device 401 is decreased in proportion to the increase of the number of pixels. As a result, there is a problem that as the number of pixels increases, the transfer speed of the optical space transfer apparatus 400 is significantly decreased.

It is possible to increase the reading speed of the image sensor 402 by decreasing the number of pixels. However, where the surface area of each pixel is fixed, this technique reduces the surface area of the light receiving region (pixel region), which makes it difficult to adjust the optical axis. In addition, where the number of pixels is decreased while the surface area of the light receiving region (pixel region) is kept the same, the optical axis adjustment is facilitated but the surface area of each pixel is enlarged. As a result, the parasitic capacitance of each pixel increases and thus the signal reading speed per unit pixel decreases.

Accordingly, an object of the present invention is to realize, in an optical space transfer apparatus which alleviates the required degree of precision of optical axis adjustment using an image sensor, high speed communication by increasing the signal reading speed of an image sensor.

SUMMARY OF THE INVENTION

The present invention is directed to an optical space transfer apparatus for transferring an optical signal from a transmission device to a reception device. In order to achieve the above-described object, the optical space transfer apparatus according to the present invention includes a transmission device and a reception device. The transmission device includes a first light emission unit having a light source for emitting one optical signal. The reception unit includes an X-Y address system image sensor, having a pixel region including a plurality of pixels, for receiving the optical signal by the pixel region; a classification unit for creating classification information representing a pixel group including pixels, among the plurality of pixels, which are irradiated with the optical signal; and a control unit for controlling the X-Y address system image sensor in accordance with the classification information to simultaneously read signals of the pixels belonging to the pixel group.

Preferably, the first light emission unit allows the light source to emit light to emit a setting optical signal for performing initial setting, before starting emission of the optical signal; the X-Y address system image sensor receives the setting optical signal by the pixel region; and the classification unit extracts and puts pixels, among the plurality of pixels, having a receiving level of the setting optical signal equal to or higher than a predetermined threshold value into a pixel group to create the classification information.

Preferably, the control unit does not read a signal of a pixel, among the plurality of pixels, other than the pixels of the pixel group.

The reception device may further include a storage unit for storing the classification information, and the control unit may read the classification information stored in the storage unit to control the X-Y address system image sensor.

The reception unit may further include a transmission unit for transmitting a signal requesting the transmission device for transfer of data; and the transmission device may further include a reception unit for receiving the signal, requesting for transfer of the data, which is sent from the transmission unit.

The transmission unit may be a second light emission unit for emitting an optical signal requesting the transmission device for transfer of the data; and the second light emission unit may emit the optical signal requesting for transfer of the data at a predetermined timing at which the storage unit completes storage of the classification information.

The reception unit may be a light reception unit for receiving the optical signal, requesting for transfer of the data, which is emitted from the second light emission unit and converting the optical signal into an electric signal; and the first light emission unit may obtain the electric signal input thereto from the light reception unit and start emitting the optical signal.

The first light emission unit may further include a pilot light source for emitting a pilot optical signal for correcting an optical axis shift; the X-Y address system image sensor may further receive the pilot optical signal by the pixel region; the classification unit may further detect a positional change of pixels, among the plurality of pixels, which are irradiated with the pilot optical signal; and the control unit may further correct the optical axis shift in accordance with the positional change.

The classification unit may further detect a positional change of pixels irradiated with the optical signal; and the control unit may further correct an optical axis shift in accordance with the positional change.

The reception device may further include a correcting image sensor for correcting an optical axis shift, and a beam splitter for dividing the optical signal to be directed to irradiate the correcting image sensor and the X-Y address system image sensor; the correcting image sensor may receive the optical signal by a pixel region including a plurality of pixels; the classification unit may further detect a positional change of pixels, of the correcting image sensor, which are irradiated with the optical signal; and the control unit may further correct the optical axis shift in accordance with the positional change.

The transmission device may include a first light emission unit having a plurality of light sources for emitting a plurality of optical signals. The reception unit may include an X-Y address system image sensor, having a pixel region including a plurality of pixels, for receiving the plurality of optical signals by the pixel region; a classification unit for creating classification information representing a plurality of pixel groups corresponding to the plurality of optical signals, each pixel group including pixels, among the plurality of pixels, which are irradiated with each of the plurality of optical signals; and a control unit for controlling the X-Y address system image sensor in accordance with the classification information to simultaneously read signals of the pixels belonging to the plurality of pixel groups on a group-by-group basis.

Preferably, the first light emission unit allows the plurality of light sources to sequentially emit light to sequentially emit a plurality of setting optical signals for performing initial setting, before starting emission of the plurality of optical signals; the X-Y address system image sensor sequentially receives the plurality of setting optical signals by the pixel region; and each time when one of the plurality of setting optical signals emitted sequentially is received, the classification unit extracts and puts pixels, among the plurality of pixels, having a receiving level equal to or higher than a predetermined threshold value into one pixel group to create the classification information.

The first light emission unit may further allow all the plurality of light sources to simultaneously emit light to simultaneously emit a plurality of pixel-limiting setting optical signals, before sequentially emitting the plurality of setting optical signals; and the classification unit may create the classification information only for the pixels which have received the plurality of pixel-limiting setting optical signals.

The first light emission unit may allow the plurality of light sources to simultaneously emit light at different light intensities to simultaneously emit a plurality of setting optical signals for performing initial setting, before starting emission of the plurality of optical signals; the X-Y address system image sensor may simultaneously receive the plurality of setting optical signals by the pixel region; and the classification unit may put pixels which have received the plurality of setting optical signals into pixel groups in accordance with receiving levels thereof to create the classification information.

The first light emission unit may allow light sources included in each of a plurality of light source groups, obtained by dividing the plurality of light sources, to simultaneously emit light at different light intensities on a light source group-by-light source group basis to simultaneously emit a plurality of setting optical signals for performing initial setting on a light source group-by-light source group basis, before starting emission of the plurality of optical signals; the X-Y address system image sensor may simultaneously receive the plurality of setting optical signals from the light source groups by the pixel region on a light source group-by-light source group basis; and each time when the plurality of setting optical signals from the light source groups are received on a light source group-by-light source group basis, the classification unit may put pixels which have received the plurality of setting optical signals into pixel groups in accordance with receiving levels thereof to create the classification information.

The first light emission unit may further allow all the plurality of light sources to simultaneously emit light to simultaneously emit a plurality of pixel-limiting setting optical signals, before simultaneously emitting the plurality of setting optical signals on a light source group-by-light source group basis; and the classification unit may create the classification information only for the pixels which have received the plurality of pixel-limiting setting optical signals.

Preferably, the control unit does not read a signal of a pixel, among the plurality of pixels, other than the pixels of the plurality of pixel groups.

The classification unit may further detect a positional change of pixels irradiated with at least one of the plurality of optical signals; and the control unit may further correct an optical axis shift in accordance with the positional change.

The reception device may further include a correcting image sensor for correcting an optical axis shift, and a beam splitter for dividing at least one of the plurality of optical signals to be directed to irradiate the correcting image sensor and the X-Y address system image sensor; the correcting image sensor may receive the at least one of the plurality of optical signals by a pixel region including a plurality of pixels; the classification unit may further detect a positional change of pixels, of the correcting image sensor, which are irradiated with the at least one of the plurality of optical signals; and the control unit may further correct the optical axis shift in accordance with the positional change.

As described above, the present invention can realize, in an optical space transfer apparatus which alleviates the required degree of precision of optical axis adjustment using an image sensor, high speed communication by increasing the signal reading speed of an image sensor.

BRIEF DESCRIPTION OF THE DRAWINGS

FIG. 9 illustrates a concept of pixel classification and grouping performed by the classification unit 106 according to the present invention.

DESCRIPTION OF THE REFERENCE CHARACTERS

| | |
|---|---|
| 10-1-10-4, 103-1, 203-1-203-4 | Light source |
| 100, 200, 300, 400 | Optical space transfer apparatus |
| 101, 201, 301 | Transmission device |
| 102, 302, 401 | Reception device |
| 103, 109, 203, 304 | Light emission unit |
| 104 | Light reception unit |
| 105, 205, 402 | Image sensor |
| 106 | Classification unit |
| 107 | Storage unit |
| 108 | Control unit |
| 120, 403 | Vertical scanning circuit |
| 121, 404 | Horizontal scanning circuit |
| 122, 405 | Output signal line |
| 206 | Beam splitter |
| 303 | S-P conversion unit |
| 305 | Lens |
| 306 | PD array unit |
| 307 | P-S conversion unit |
| #1-#64 | Pixel |

DETAILED DESCRIPTION OF THE PRESENT INVENTION

First Embodiment

Figure 1:
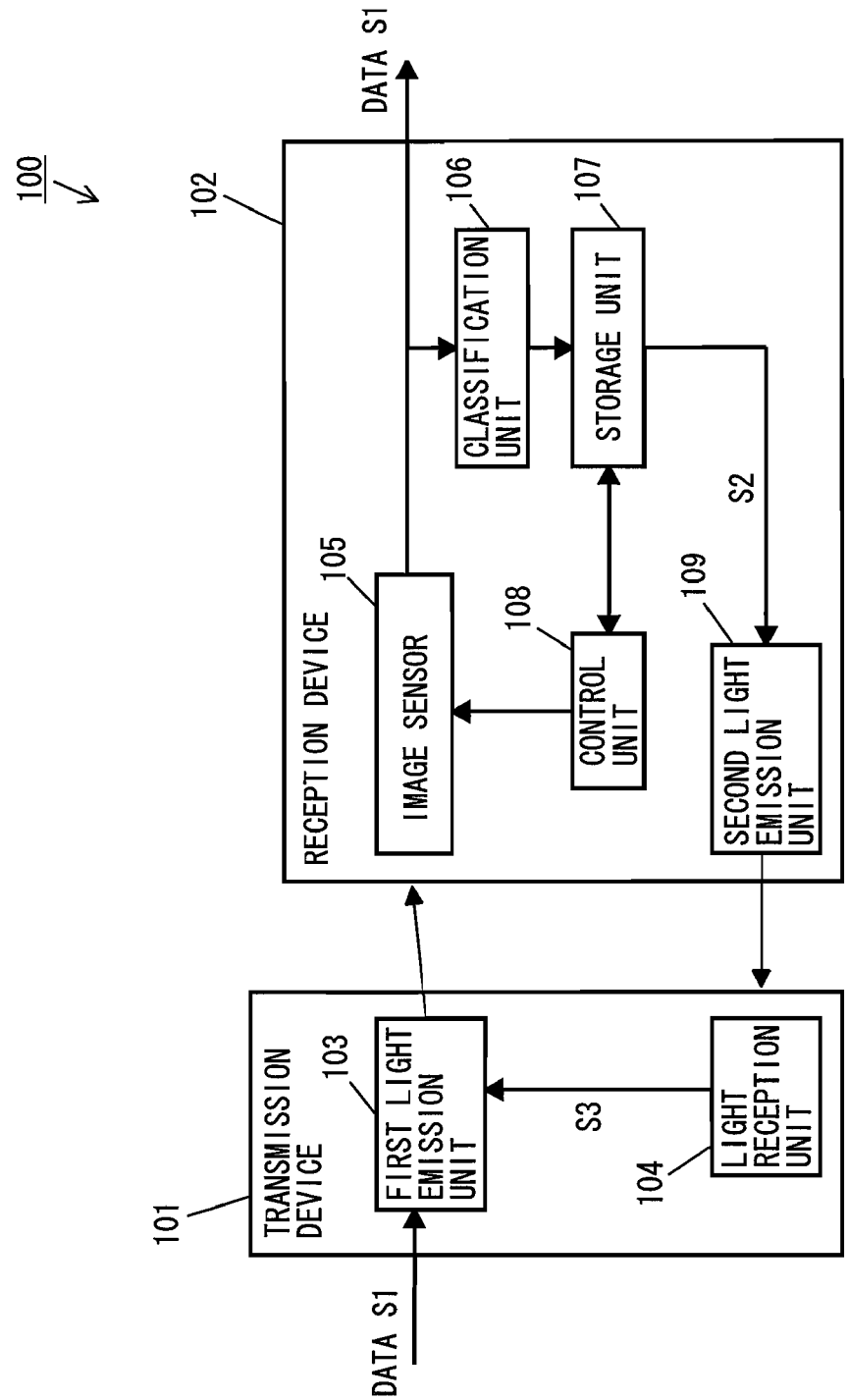
FIG. 1 shows an example of a structure of an optical space transfer apparatus 100 according to a first embodiment of the present invention.

FIG. 1 shows an example of a structure of an optical space transfer apparatus 100 according to a first embodiment of the present invention. As shown in FIG. 1, the optical space transfer apparatus 100 includes a transmission device 101 and a reception device 102. The transmission device 101 includes a first light emission unit 103 and a light reception unit 104. The reception device 102 includes an X-Y address system image sensor (hereinafter, referred to simply as an "image sensor") 105, a classification unit 106, a storage unit 107, a control unit 108, and a second light emission unit 109.

Figure 2:
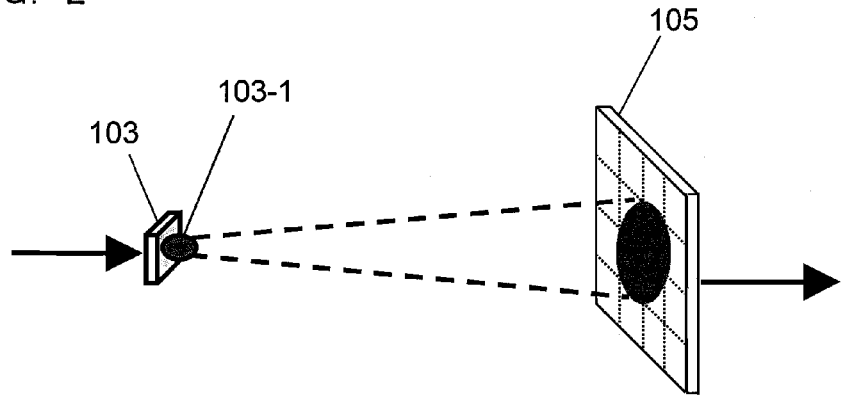
FIG. 2 specifically shows a first light emission unit 103 and an image sensor 105 according to the present invention.

FIG. 2 specifically shows the first light emission unit 103 and the image sensor 105. As shown in FIG. 2, the first light emission unit 103 includes one light source 103-1. The image sensor 105 has a pixel region including a plurality of pixels. Hereinafter, the image sensor 105 will be described as including 16 pixels as an example.

Figure 3:
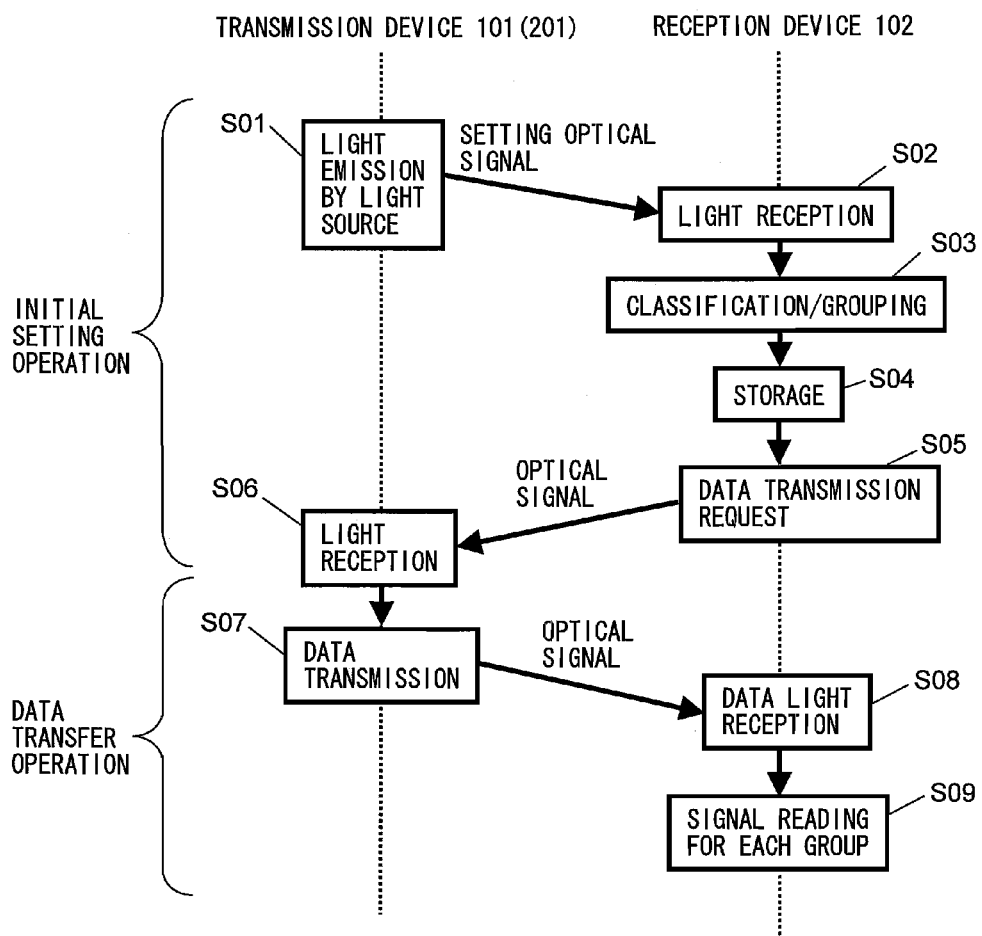
FIG. 3 illustrates an operation of the optical space transfer apparatus 100 according to the present invention.

FIG. 3 illustrates an operation of the optical space transfer apparatus 100. Hereinafter, with reference to FIG. 1 through FIG. 3, an overview of the operation of the optical space transfer apparatus 100 will be described. The optical space transfer apparatus 100 performs an initial setting operation (step S01 through step S06) and a data transfer operation (step S07 through step S09) executed after the initial setting operation.

First, the initial setting operation will be described. The first light emission unit 103 allows the light source 103-1 to emit light (step S01). Thus, the first light emission unit 103 irradiates the image sensor 105 with a setting optical signal for performing initial setting for data transfer (see FIG. 2). The image sensor 105 receives the setting optical signal by the pixel region in which the plurality of pixels are arranged in a matrix (step S02). Then, the image sensor 105 sequentially outputs electric signals of the respective pixels. Based on the electric signals of the respective pixels which are output from the image sensor 105, the classification unit 106 performs pixel classification and grouping processing (step S03) which will be described later in detail, and outputs classification information, which is a result of the processing. The storage unit 107 performs storage processing on the classification information (step S04), and in parallel therewith, outputs a signal S2 representing the timing at which the storage processing is completed to the second light emission unit 109. The second light emission unit 109 converts the signal S2 from the electric signal into an optical signal (hereinafter, such conversion will be referred to as "electro-optical conversion"), and emits the optical signal as a data transmission request signal toward the light reception unit 104 in the transmission device 101 (step S05). The light reception unit 104 receives the data transmission request signal (step S06).

Now, the data transfer operation will be described. Upon receipt of the data transmission request signal, the light reception unit 104 outputs a data transmission start signal S3 to the first light emission unit 103. Upon receipt of the data transmission start signal S3 input thereto, the first light emission unit 103 irradiates the image sensor 105 with a data optical signal obtained as a result of the electro-optical conversion performed on transfer data S1 using the light source 103-1 (step S07). The image sensor 105 receives the data optical signal by the pixel region (step S08). It is assumed that the pixels irradiated with the data optical signal are the same as the pixels irradiated with the setting optical signal in step S02. Namely, it is assumed that the positional relationship between the first light emission unit 103 and the image sensor 105 is the same for the initial setting operation and for the data transfer operation. The control unit 108 controls the operation of the image sensor 105 in a method described later in detail, using the classification information stored in the storage unit 107, so that the image sensor 105 reads the electric signals of the respective pixels (step S09). Thus, the image sensor 105 reproduces the transfer data S1.

Figure 4:
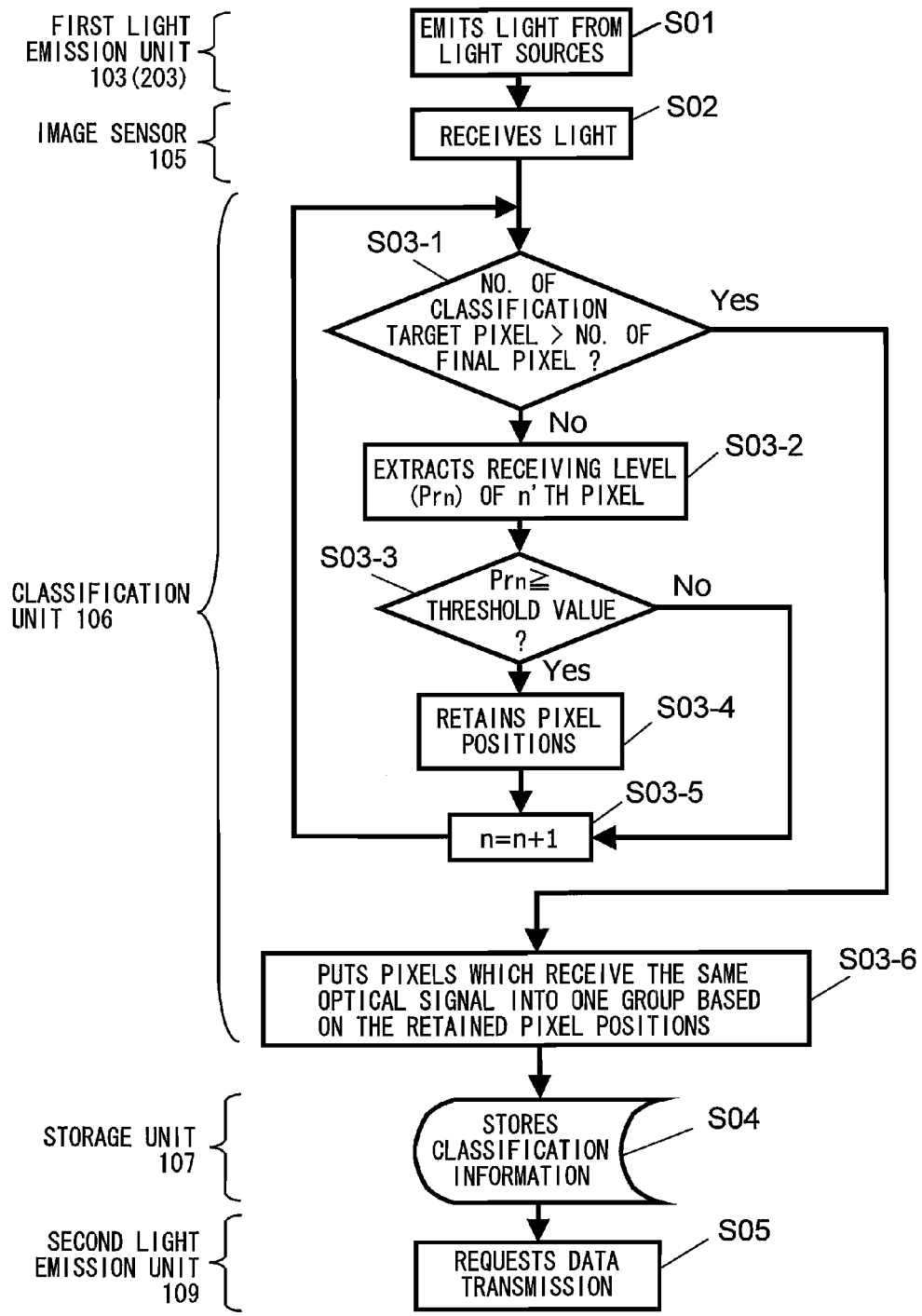
FIG. 4 is a flowchart illustrating, in detail, an initial setting operation (steps S01 through S06) described with reference to FIG. 3.
Figure 5:
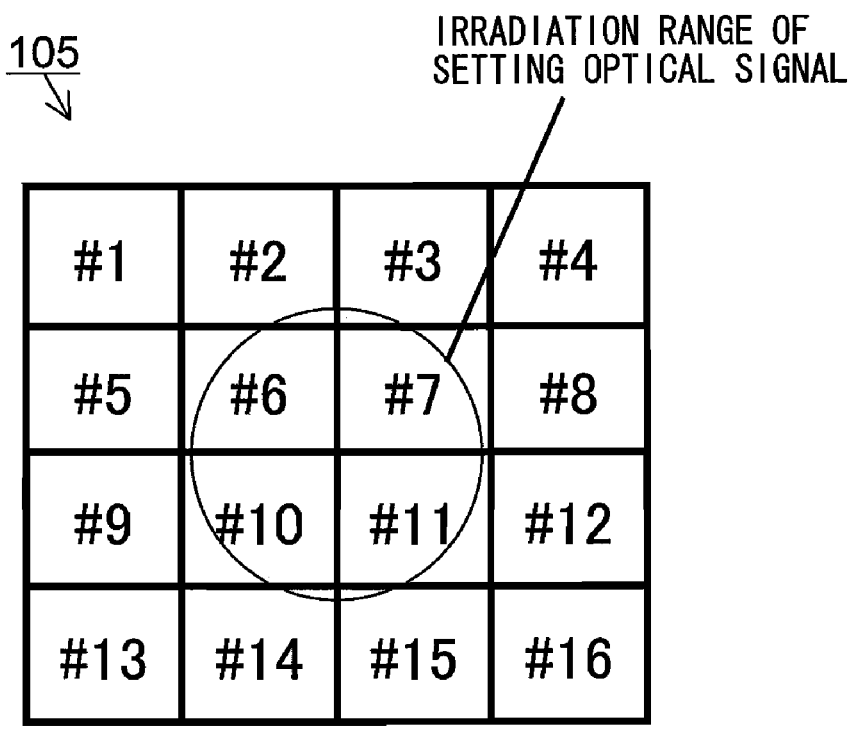
FIG. 5 illustrates a concept of pixel classification and grouping performed by a classification unit 106 according to the present invention.

FIG. 4 is a flowchart illustrating, in detail, the initial setting operation (steps S01 through S06) described with reference to FIG. 3. Steps S01, S02, S04 and S05 shown in FIG. 4 are the same as steps S01, S02, S04 and S05 shown in FIG. 3, respectively. Steps S03-1 through S03-6 shown in FIG. 4 are included in step S03 shown in FIG. 3. FIG. 5 illustrates a concept of pixel classification and grouping performed by the classification unit 106. FIG. 5 shows the image sensor 105 in which the pixels #1 through #16 are arranged as an example. Again as an example, FIG. 5 shows a case where a setting optical signal emitted from the light source 103-1 in the first light emission unit 103 mainly irradiates the pixels #6, #7, #10 and #11.

Hereinafter, with reference to FIG. 4 and FIG. 5, the initial setting operation will be described in detail. First, the light source 103-1 in the first light emission unit 103 emits light (step S01), and a setting optical signal is directed to irradiate the image sensor 105 (see FIG. 2). The image sensor 105 receives the setting optical signal (step S02). In the following, a case where the setting optical signal mainly irradiates the pixels #6, #7, #10 and #11 in the image sensor 105 as shown in FIG. 5 will be described as an example.

The classification unit 106 determines whether or not the number (#) of the pixel #1, which is a classification target, is larger than the number of the final pixel #16 (step S03-1). Since the number of the pixel #1 as the classification target is not larger than the number of the final pixel #16, the operation goes to step S03-2. Next, the classification unit 106 extracts a receiving power level ($Pr_1$) of the pixel #1 from the output of the image sensor 105 (step S03-2). Then, the classification unit 106 determines whether or not the extracted receiving power level ($Pr_1$) is equal to or higher than a predetermined threshold value (step S03-3). Since the pixel #1 is not irradiated with the setting optical signal (see FIG. 5), $Pr_1$ is determined as not being equal to or higher than the predetermined threshold value, and the operation goes to step S03-5. The classification unit 106 adds "1" to the number of the pixel #1 to set the pixel #2 as the next classification target (step S03-5), and the operation returns to step S03-1. After this, processing similar to the above is executed. Since the pixels #2 through #5 are hardly irradiated with the setting optical signal (see FIG. 5), receiving power levels $Pr_2$ through $Pr_5$ of the pixels #2 through #5 are determined as not being equal to or higher than the predetermined threshold value, and the operation returns to steps S03-1.

Next, the classification unit 106 determines whether or not the number of the pixel #6, which is a classification target, is larger than the number of the final pixel #16 (step S03-1). Since the number of the pixel #6 as the classification target is not larger than the number of the final pixel #16, the operation goes to step S03-2. Next, the classification unit 106 extracts a receiving power level ($Pr_6$) of the pixel #6 from the output of the image sensor 105 (step S03-2). Then, the classification unit 106 determines whether or not the extracted receiving power level ($Pr_6$) is equal to or higher than the predetermined threshold value (step S03-3). Since the pixel #6 is irradiated with the setting optical signal (see FIG. 5), $Pr_6$ is determined as being equal to or higher than the predetermined threshold value, and the operation goes to step S03-4. The classification unit 106 retains the position of the pixel #6 in the pixel region (step S03-4). Then, the classification unit 106 adds "1" to the number of the pixel #6 to set the pixel #7 as the next classification target (step S03-5), and the operation returns to step S03-1. Similarly, since the pixel #7 is irradiated with the setting optical signal (see FIG. 5), a receiving power level $Pr_7$ of the pixel #7 is determined as being equal to or higher than the predetermined threshold value, and the position of the pixel #7 in the pixel region is retained.

After this, steps S03-1 through S03-5 are repeated in a similar manner by setting each of the pixels #8 through #16 as a classification target. Then, in step S03-5, a pixel #17 (nonexistent in actuality) is set as a classification target, and the operation returns to step S03-1. As a result, the classification unit 106 retains the positions of the pixels #6, #7, #10 and #11 in the pixel region. Namely, in steps S03-1 through S03-5, the pixels having a receiving power level of a predetermined threshold value or higher are classified (extracted), and the positions of such pixels in the pixel region are retained in the classification unit 106.

Next, the classification unit 106 determines whether or not the number of the pixel #17, which is the classification target, is larger than the number of the final pixel #16 (step S03-1). Since the number of the pixel #17 as the classification target is larger than the number of the final pixel #16, the operation goes to step S03-6. Then, the classification unit 106 associates the retained positions of the pixels in the pixel region based on the inter-position continuity and thus performs grouping. Specifically, the classification unit 106 puts pixels at a plurality of pixel positions, among the retained pixel positions in the pixel region, which are continuous by being adjacent to each other into one group. More specifically, as shown in FIG. 5, the classification unit 106 puts the pixels #6, #7, #10 and #11, which have continuous positions by being adjacent to each other, into one group. Thus, the classification unit 106 can put the pixels which receive the same optical signal (pixels #6, #7, #10 and #11) into one group (step S03-6). Then, the classification unit 106 creates classification information representing the pixels put into one group. In step S03-6, the classification unit 106 may merely put pixels at the retained positions into one group without considering the inter-position continuity of the pixels.

The storage unit 107 performs storage processing on the classification information (step S04), and in parallel therewith, outputs the signal S2 representing the timing at which the storage processing is completed to the second light emission unit 109. The second light emission unit 109 performs electro-optical conversion on the signal S2, and emits the resultant optical signal as a data transmission request signal toward the light reception unit 104 in the transmission device 101 (step S05). The light reception unit 104 receives the data transmission request signal (not shown in FIG. 4).

Now, an example of a method for setting the threshold value for the light receiving power level used in step S03-3 shown in FIG. 4 will be described. As an example, a receiving power level (threshold value) fulfilling an error rate $10^{-12}$ will be set. In the following, a hypothetical case is provided where the light receiving power per unit pixel is small and thermal noise is dominant as the noise component (a case where the shot noise and the relative intensity noise of the light source, etc. are negligible).

First, a case where only one pixel receives an optical signal will be discussed. In general, the error rate in the case where a binary optical signal is received can be represented by the following expression 1 using a complementary error function (erfc).

$$\text{Error rate} = \frac{1}{2}\text{erfc}\left(\frac{I_1 - I_0}{2\sqrt{2}\,\sigma}\right) \qquad [\text{Expression 1}]$$

where $I_1$ is the light receiving current of the pixel when the pixel is irradiated with the optical signal, $I_0$ is the light receiving current of the pixel when the pixel is not irradiated with the optical signal, and $\sigma$ is the thermal noise current. The identification current level is $(I_1 - I_0)/2$. The data transfer speed is 100 MHz, the opto-electric conversion efficiency is 0.5, the extinction ratio is 6 dB, and the noise current density is 10 pA/√Hz. In this case, from expression 1, −24.3 dBm is obtained as the receiving power level (threshold value) which fulfills the error rate of $10^{-12}$.

Next, a case where a plurality of pixels put into one group receive an optical signal as in this embodiment will be discussed. In this case, the error rate can be represented by the following expression 2, which is obtained by extending expression 1. In the expression, k is the number of the pixels put into one group.

$$\text{Error rate} = \frac{1}{2}\text{erfc}\left(\frac{\sum_{i,j}(I_{1ij} - I_{0ij})}{2\sqrt{2}\,\sqrt{k}\,\sigma}\right) \qquad [\text{Expression 2}]$$

where $\sigma$ is the thermal noise current generated for each pixel, which is equal for all the pixels. $I_{1ij}$ and $I_{0ij}$ are respectively the light receiving currents of the pixel at the coordinate (i, j) in the pixel region when such a pixel is irradiated with the optical signal and when such a pixel is not irradiated with the optical signal. In this case, from expression 2, the following expression 3 needs to be fulfilled in order to fulfill the error rate of $10^{-12}$.

$$\frac{\sum_{i,j}(I_{1ij} - I_{0ij})}{\sqrt{k}\,\sigma} = 14.07 \qquad [\text{Expression 3}]$$

From this, once the light receiving currents ($I_{1ij}$, $I_{0ij}$) of each pixel to be irradiated with the optical signal are detected, the receiving power level (threshold value) fulfilling expression 3 can be set by selecting the pixels to be put into one group. In the case where the light receiving currents ($I_{1ij}$, $I_{0ij}$) of each pixel irradiated with the optical signal are not detected or when k is not determined, the receiving power level (threshold value) may be set by the method using expression 1.

Figure 6:
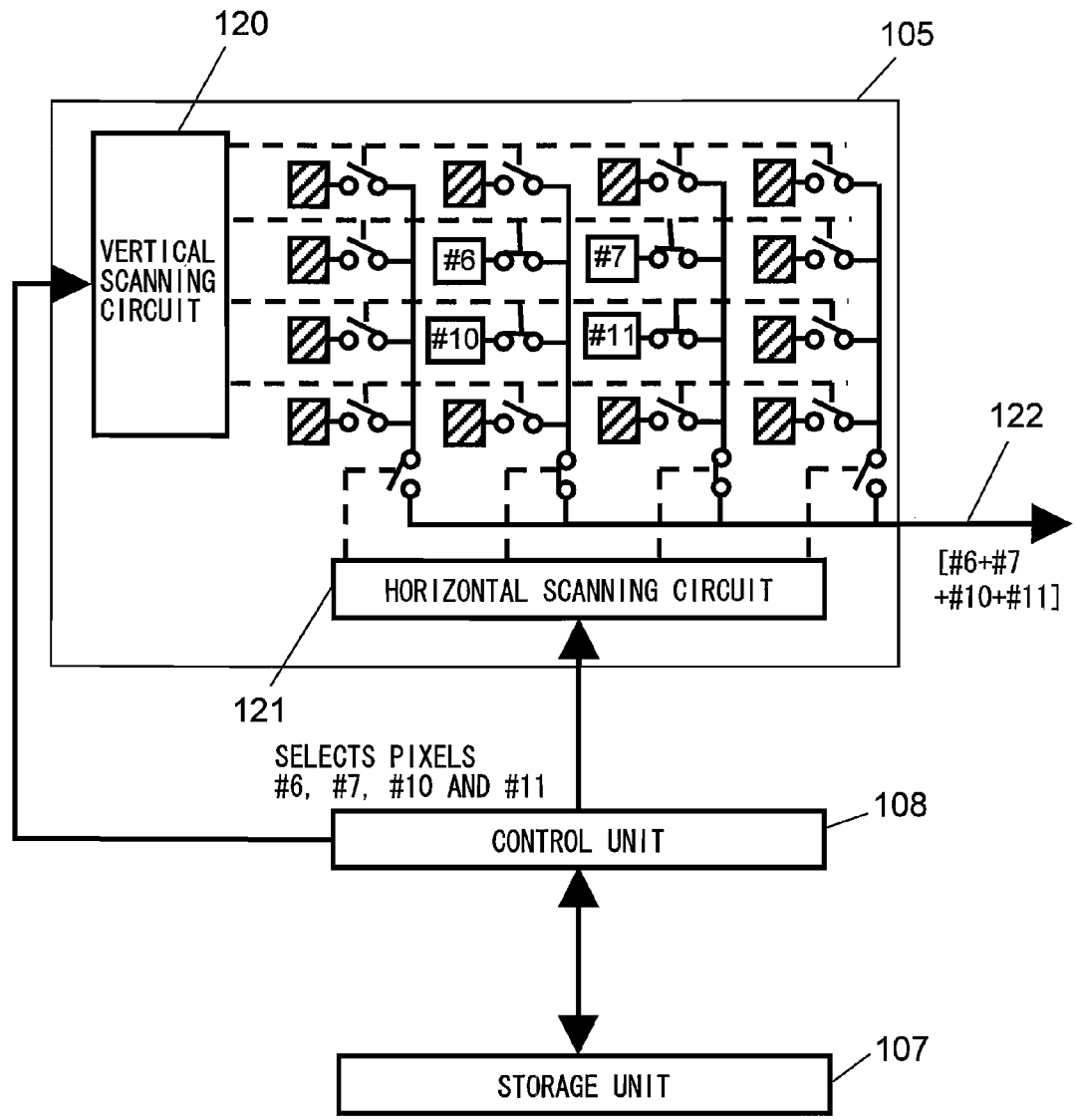
FIG. 6 illustrates an operation of the image sensor 105 for reading a signal of each pixel in step S09 shown in FIG. 3.

FIG. 6 illustrates an operation of the image sensor 105 for reading a signal of each pixel in step S09 in FIG. 3. As shown in FIG. 6, the image sensor 105 includes a vertical scanning circuit 120, a horizontal scanning circuit 121, pixels #1 through #16, and an output signal line 122. For the convenience of description, the pixels other than the pixels #6, #7, #10 and #11 are represented with hatching.

The control unit 108 reads the classification information (information representing the pixels put into one group) stored in the storage unit 107, and controls the operation of the image sensor 105 for reading a pixel signal in accordance with the classification information. This will be described more specifically, hereinafter. The control unit 108 reads the classification information, stored in the storage unit 107, which indicates that the pixels #6, #7, #10 and #11 are in one group. Next, the control unit 108 controls the vertical scanning circuit 120 and the horizontal scanning circuit 121 in the image sensor 105 in accordance with the read classification information to simultaneously read the signals of the pixels #6, #7, #10 and #11. The control unit 108 adds together the read signals of the pixels and simultaneously outputs the signals to the output signal line 122. The signals of the pixels other than the pixels #6, #7, #10 and #11 are not read.

In this manner, the control unit 108 reads the signals of the pixels irradiated with the optical signal collectively in accordance with the classification information, but does not read the signals of the pixels not irradiated with the signal. Namely, the image sensor 402 included in the conventional optical space transfer apparatus 400 sequentially reads the signals of all the pixels on a pixel-by-pixel basis, whereas the control unit 108 reads only the signals of the pixels in the image sensor 105 irradiated with an optical signal collectively. Thus, in the case of an image sensor including 16 pixels described above as an example, the control unit 108 can reduce the number of times the reading operation is performed from 16 times to once.

As described above, the optical space transfer apparatus 100 according to the first embodiment specifies the pixels receiving an optical signal and puts the pixels receiving the same optical signal into one group by the initial setting operation. By the data transfer operation, the optical space transfer apparatus 100 reads the signals of the pixels put into the same group simultaneously. Thus, the optical space transfer apparatus 100 can significantly improve the signal reading speed of the image sensor as compared with the conventional optical space transfer apparatus 400 to realize high speed communication while alleviating the required degree of precision of optical axis adjustment like the conventional optical space transfer apparatus 400.

In the first embodiment, the feedback of the transmission request signal to the transmission device 101 is performed by optical space transfer. The feedback of a transmission request signal is not limited to being performed by optical space transfer. As long as the transmission request signal is transferred from the reception device 102 to the transmission device 101, any other means is usable. In such a case, for example, the reception device 102 includes a transmission unit for transmitting a transmission request signal in place of the second light emission unit 109, and the transmission device 101 includes a reception unit for receiving the transmission request signal in place of the light reception unit 104.

In the first embodiment, the transmission device 101 starts data transmission after receiving the transmission request signal. Alternatively, the transmission device 101 may start data transmission at the time when the classification information is stored in the storage unit 107 in the reception device 102. In this case, neither the light reception unit 104 nor the second light emission unit 109 is necessary (see FIG. 1).

In the first embodiment, the signal S2 representing the timing when the storage unit 107 completes the storage of the classification information is output by the storage unit 107 to the second light emission unit 109. Alternatively, the signal S2 may be output by the classification unit 106 or the control unit 108 to the second light emission unit 109.

In the first embodiment, the modulation system used in the first light emission unit 103 may be a direct modulation system or an external modulation system.

In the first embodiment, the image sensor 105 including one output signal line is described. Alternatively, an image sensor including a plurality of output signal lines may be used.

Second Embodiment

In the first embodiment, an optical signal is transferred along one optical axis. In a second embodiment, an optical signal is transferred along a plurality of optical axes. An operation period of each pixel of the image sensor includes a signal accumulation period for accumulating signals and a signal reading period of reading the accumulated signals. Namely, the pixels cannot accumulate signals during the signal reading period. In the case where an optical signal is transferred along a plurality of optical axes, while signals of a group of pixels are read collectively (signal reading period), signals can be accumulated in another group of pixels. Namely, according to the second embodiment, by transferring an optical signal along a plurality of optical axes for data communication, a decrease of the transfer speed, which is otherwise caused by the signal reading period, can be avoided. In the meantime, in the second embodiment, in order to perform data communication, it is necessary that optical signals respectively forming optical axes are sequentially directed to irradiate the image sensor on the transmission side while the signals of a plurality of groups of pixels are sequentially read on a group-by-group basis on the receiving side.

Figure 7:
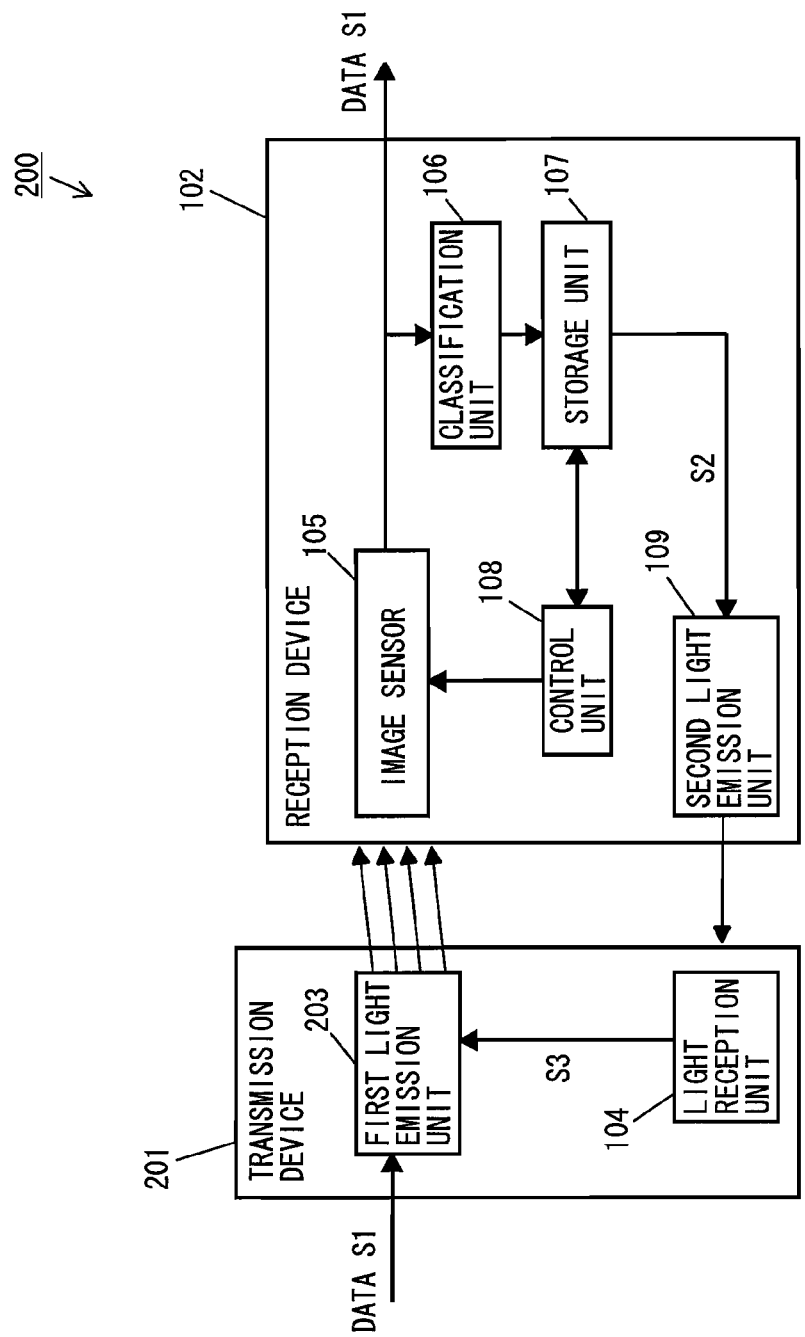
FIG. 7 shows an example of a structure of an optical space transfer apparatus 200 according to a second embodiment of the present invention.

FIG. 7 shows an example of a structure of an optical space transfer apparatus 200 according to the second embodiment. As shown in FIG. 7, the optical space transfer apparatus 200 includes a transmission device 201 in place of the transmission device 101 included in the optical space transfer apparatus 100 (see FIG. 1) according to the first embodiment. The transmission device 201 includes a first light emission device 203 in place of the first light emission device 103 included in the transmission device 101 in the optical space transfer apparatus 100. Among the elements of the optical space transfer apparatus 200, the elements identical to those of the optical space transfer apparatus 100 bear the identical reference numerals therewith and the same descriptions will not be repeated.

Figure 8:
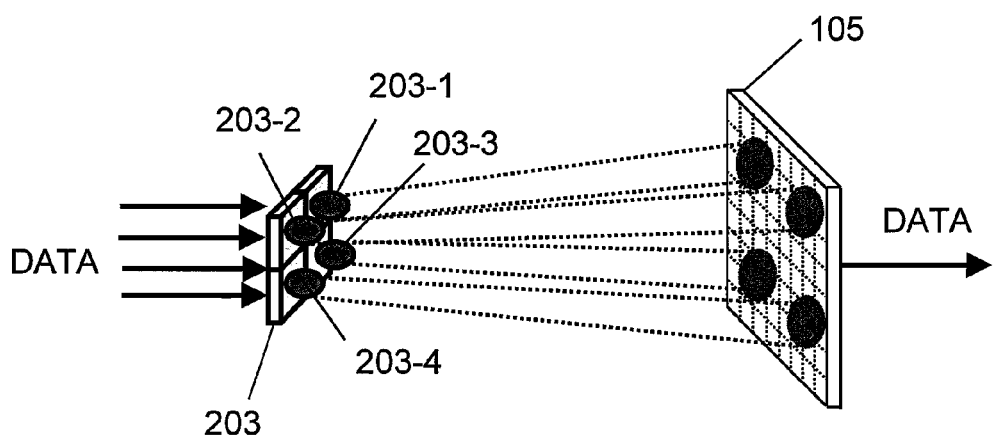
FIG. 8 specifically shows a first light emission unit 203 and an image sensor 105 according to the present invention.

FIG. 8 specifically shows the first light emission unit 203 and the image sensor 105. As shown in FIG. 8, the first light emission unit 203 includes an S-P conversion unit (not shown) and four light sources 203-1, 203-2, 203-3 and 203-4. The image sensor 105 has a pixel region including a plurality of pixels. Optical signals emitted from the four light sources 203-1, 203-2, 203-3 and 203-4 along four optical axes irradiate the pixel region of the image sensor 105 without being overlapped with one another. Hereinafter, the image sensor 105 will be described as including 64 pixels as an example.

FIG. 9 illustrates a concept of pixel classification and grouping performed by the classification unit 106. As shown in FIG. 9, pixels #1 through #64 are arranged in the pixel region of the image sensor 105. FIG. 9 shows a case where a setting optical signal A, which is a setting optical signal emitted from the light source 203-1 in the first light emission unit 203, mainly irradiates the pixel #10, #11, #18 and #19; a setting optical signal B, which is a setting optical signal emitted from the light source 203-2 in the first light emission unit 203, mainly irradiates the pixel #14, #15, #22 and #23; a setting optical signal C, which is a setting optical signal emitted from the light source 203-3 in the first light emission unit 203, mainly irradiates the pixel #42, #43, #50 and #51; and a setting optical signal D, which is a setting optical signal emitted from the light source 203-4 in the first light emission unit 203, mainly irradiates the pixel #46, #47, #54 and #55.

Hereinafter, again with reference to FIG. 3 and FIG. 4 used in the first embodiment, an operation of the optical space transfer apparatus 200 will be described. First, the initial setting operation will be described. The transmission unit 201 allows only the light source 203-1 to emit light (step S01). At this point, the pixel region of the image sensor 105 is irradiated with only the setting optical signal A shown in FIG. 9. As shown in FIG. 9, the image sensor 105 receives the setting optical signal A directed thereto in the pixels #10, #11, #18 and #19 (step S02). The classification unit 106 repeats the operations in steps S03-1 through S03-5 to retain the positions of the pixels #10, #11, #18 and #19. Then, based on the retained pixel positions, the classification unit 106 puts the pixels #10, #11, #18 and #19 receiving the setting optical signal A into one group (hereinafter, referred to as a "group A") (step S03-6). Next, the classification unit 106 creates classification information representing the group A. The storage unit 107 stores the created classification information (step S04).

Next, the transmission unit 201 allows only the light source 203-2 to emit light (step S01). At this point, the pixel region of the image sensor 105 is irradiated with only the setting optical signal B shown in FIG. 9. As shown in FIG. 9, the image sensor 105 receives the setting optical signal B directed thereto in the pixels #14, #15, #22 and #23 (step S02). The classification unit 106 repeats the operations in steps S03-1 through S03-5 to retain the positions of the pixels #14, #15, #22 and #23. Then, based on the retained pixel positions, the classification unit 106 puts the pixels #14, #15, #22 and #23 receiving the setting optical signal B into one group (hereinafter, referred to as a "group B") (step S03-6). Next, the classification unit 106 creates classification information representing the group B. The storage unit 107 stores the created classification information (step S04).

After this, similarly, only the light source 203-3 is allowed to emit light and the operations of steps S01 through S04 are performed; and then only the light source 203-4 is allowed to emit light and the operations of steps S01 through S04 are performed. Thus, the storage unit 107 stores classification information representing a group C including the pixels #42, #43, #50 and #51, and classification information representing a group D including the pixels #46, #47, #54 and #55. Next, the operations of steps S05 and S06 are performed, and thus the initial setting operation is finished.

Each piece of the classification information representing one of the groups A through D includes light receiving order information which represents the order in which the respective one of the setting optical signals A through D is received. The order in which the light sources 203-1 through 203-4 are allowed to emit light by the transmission device 201 in the initial setting operation is the same as the order in which the light sources 203-1 through 203-4 are allowed to emit light by the transmission device 201 in the data transfer operation described later. Namely, the light receiving order information represents the order in which the pixel groups receive the optical signal in the data transfer operation. Thus, the storage unit 107 in the reception device 102 can store the pixel groups each receiving a respective one of the plurality of optical signals, and also can store the light receiving order information which represents the order in which the pixel groups receive the optical signals in the data transfer operation.

Now, with reference to FIG. 3, the data transfer operation will be described. The first light emission unit 203 in the transmission device 201 converts serial format transmission data S1 into parallel format transmission data by the S-P conversion unit, and inputs the parallel format transmission data to a corresponding one of the light sources. Next, the first light emission unit 203 allows the light sources to emit light in accordance with the parallel format transmission data (see FIG. 8). In this step, the first light emission unit 203 allows the light sources in the order of 203-1, 203-2, 203-3 and 203-4 to irradiate the image sensor 105 with an optical signal (step S07).

Here, the optical signal emitted by the light source 203-1 for irradiation is referred to as an "optical signal A", the optical signal emitted by the light source 203-2 for irradiation is referred to as an "optical signal B"; the optical signal emitted by the light source 203-3 for irradiation is referred to as an "optical signal C"; and the optical signal emitted by the light source 203-4 for irradiation is referred to as an "optical signal D". Thus, the pixels irradiated with the optical signals A, B, C and D are the same as the pixels irradiated with the setting optical signals A through D in the initial setting operation (see FIG. 9). Namely, it is assumed that the positional relationship between the first light emission unit 203 and the image sensor 105 is the same for the initial setting operation and for the data transfer operation.

Next, the image sensor 105 sequentially receives the optical signals A, B, C and D by the pixel region (step S08).

Figure 10:
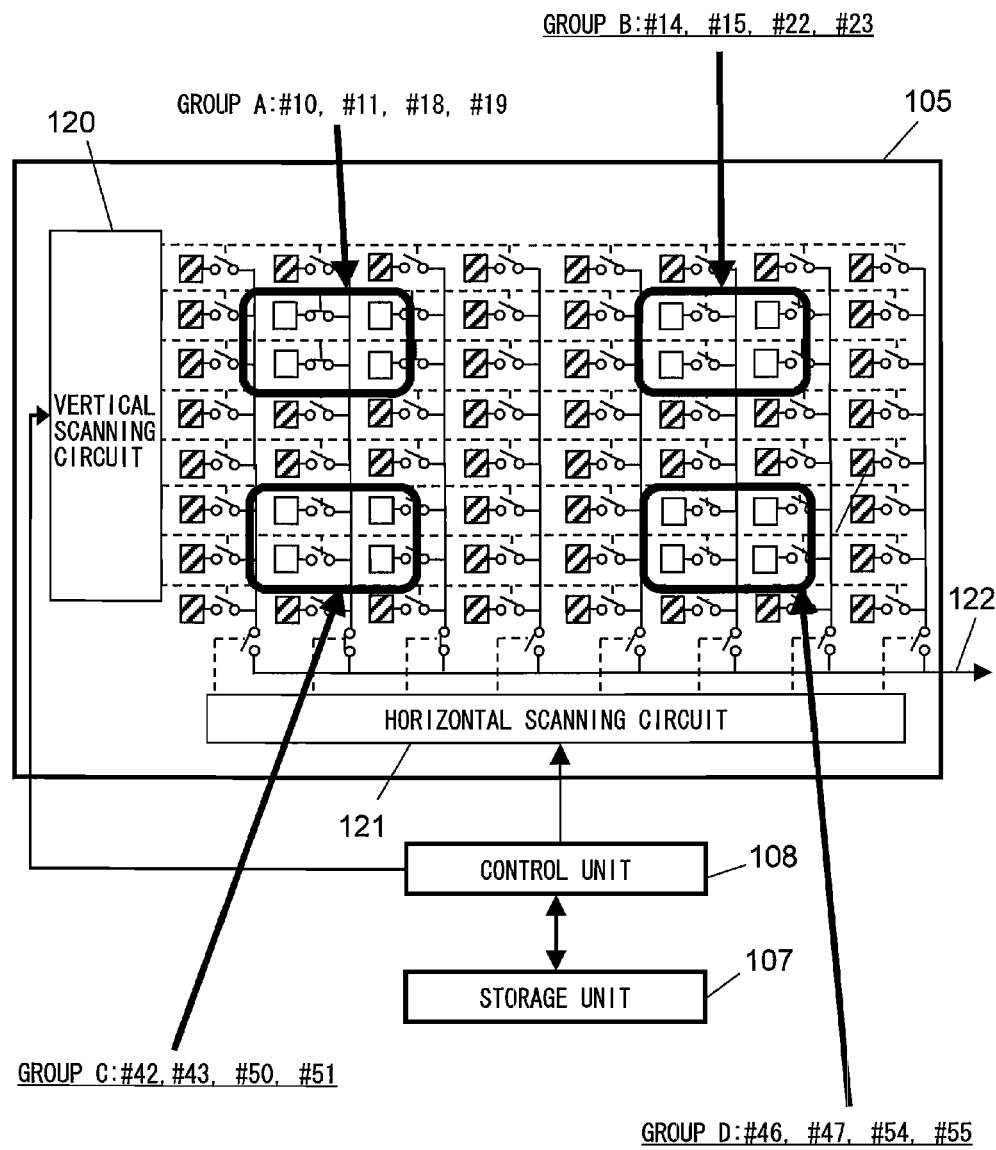
FIG. 10 illustrates an operation of the image sensor 105 for reading a signal of each pixel in step S09 shown in FIG. 3.

FIG. 10 illustrates an operation of the image sensor 105 for reading a signal of each pixel in step S09 in FIG. 3. As shown in FIG. 10, the image sensor 105 includes a vertical scanning circuit 120, a horizontal scanning circuit 121, pixels #1 through #64, and an output signal line 122. The pixels #10, #11, #18 and #19 included in the group A, the pixels #14, #15, #22 and #23 included in the group B, the pixels #42, #43, #50 and #51 included in the group C, and the pixels #46, #47, #54 and #55 included in the group D are in the areas surrounded by thick circles. The pixels not included in any of the groups A through D are represented with hatching.

The control unit 108 reads the classification information stored in the storage unit 107. The classification information represents the pixels included in the groups A through D, and also represents the order in which the pixels of the groups A through D are irradiated with the optical signals A through D. Next, the control unit 108 controls the vertical scanning circuit 120 and the horizontal scanning circuit 121 in the image sensor 105 in accordance with the classification information to read the signals of the pixels of the groups A through D collectively on a group-by-group basis (step S09). This will be described below in more detail. The control unit 108 reads the signals of the pixels included in the group A receiving the optical signal A simultaneously, and adds together the read signals of the pixels so as to be output to the output signal line 122. Then, the control unit 108 reads the signals of the pixels included in the group B receiving the optical signal B simultaneously, and adds together the read signals of the pixels so as to be output to the output signal line 122. After this, similarly, the control unit 108 simultaneously reads the signals of the pixels included in the group C so as to be output to the output signal line 122, and then simultaneously reads the signals of the pixels included in the group D so as to be output to the output signal line 122. In this manner, the control unit 108 sequentially reads the signals of the pixels included in the different groups A through D, which respectively receive the optical signals A through D sequentially, with the signals of the pixels included in the same group being read collectively. The signals of the pixels excluded from the groups A through D are not read.

As described above, the control unit 108 sequentially reads the signals of the pixels of different groups, with the signals of the pixels of the same group being read collectively, in accordance with the classification information, but does not read the signals of the pixels not irradiated with the optical signal. Thus, in the case of an image sensor including 64 pixels described above as an example, the control unit 108 can reduce the number of times the reading operation is performed from 64 times 4 times. In addition, the control unit 108 sequentially reads the signals of the pixels included in the groups A through D which respectively receive the optical signals A through D sequentially. Thus, the control unit 108 can always allow any of the optical signals A through D to be received by any of the groups A through D. As a result, the control unit 108 can avoid a decrease of the transfer speed, which is otherwise caused by the signal reading period of the pixel signals.

As described above, the optical space transfer apparatus 200 according to the second embodiment can realize higher speed communication than the optical space transfer apparatus 100 according to the first embodiment while alleviating the required degree of precision of optical axis adjustment like the optical space transfer apparatus 100.

In the second embodiment, an array type light source may be used as a plurality of light sources included in the first light emission unit 203.

The initial setting operation described above is performed by a method of sequentially allowing the light sources to emit light to sequentially read the signals of all the corresponding pixels each time when any of light sources emits light (hereinafter, this process will be referred to as "all-scan"), thereby notifying the receiving side of the light emission order in which the light sources emitted light in the data transfer operation (hereinafter, referred to as a "first method"). However, with the first method, the number of times the all-scan process is performed increases in proportion to the number of light sources (number of optical signals) and therefore the initial setting operation requires a relatively long time. Hereinafter, examples of other methods (second through fourth method) will be briefly described.

By a second method, all the light sources are allowed to emit light simultaneously, so that the all-scan process is performed only once. In this case, each light source emits a setting optical signal having a light intensity corresponding to the light emission order in the data transfer operation. According to the second method, the receiving side is notified of the light emission order in the data transfer operation by the light intensity of each received setting optical signal. The receiving side, for example, sets a plurality of threshold values for the receiving level and thus determines the light intensity of each received setting optical signal. Therefore, the second method does not require a long time for the initial setting operation. However, with the second method, where the number of light sources is large (where the number of setting optical signals is large), the difference in the light intensity among the setting optical signals is small. As a result, the S/N ratio required for the determination on the light emission order is reduced, and thus the probability that the receiving side makes an error in determining the light emission order is increased.

A third method is a combination of the first method and the second method. For example, where there are four light sources, the second method is performed on the two light sources (first light source group), and then the second method is performed on the remaining two light sources (second light source group). According to the third method, the certainty of the determination on the light emission order performed by the receiving side is increased while the time required for the initial setting operation can be shortened.

By a fourth method, before performing any of the first through third methods, all the light sources are allowed to emit light simultaneously to irradiate the pixel region with a pixel-limiting setting optical signal, which is for limiting the pixels into the classification target pixels. Thus, the all-scan process is performed once. This specifies (limits from all the pixels) the pixels which will receive the setting optical signals (classification target pixels). With the fourth method, after this, any one of the first through third methods is performed for only the specified pixels. According to the fourth method, the target pixels subjected to the all-scan process used in the first through third methods can be limited, and therefore the time required for the initial setting operation can be shortened as compared with any of the first through third methods.

Third Embodiment

In the first and second embodiments, there is a premise that the positional relationship between the transmission device and the reception device is not changed. In a third embodiment, a structure, which is adaptable in the optical space transfer apparatus according to the first or second embodiment and is capable of realizing data communication accurately even when the positional relationship between the transmission device and the reception device is changed and the optical axis is shifted, will be described. In the following description, the optical space transfer apparatus 200 according to the second embodiment will be used as an example.

Figure 11:
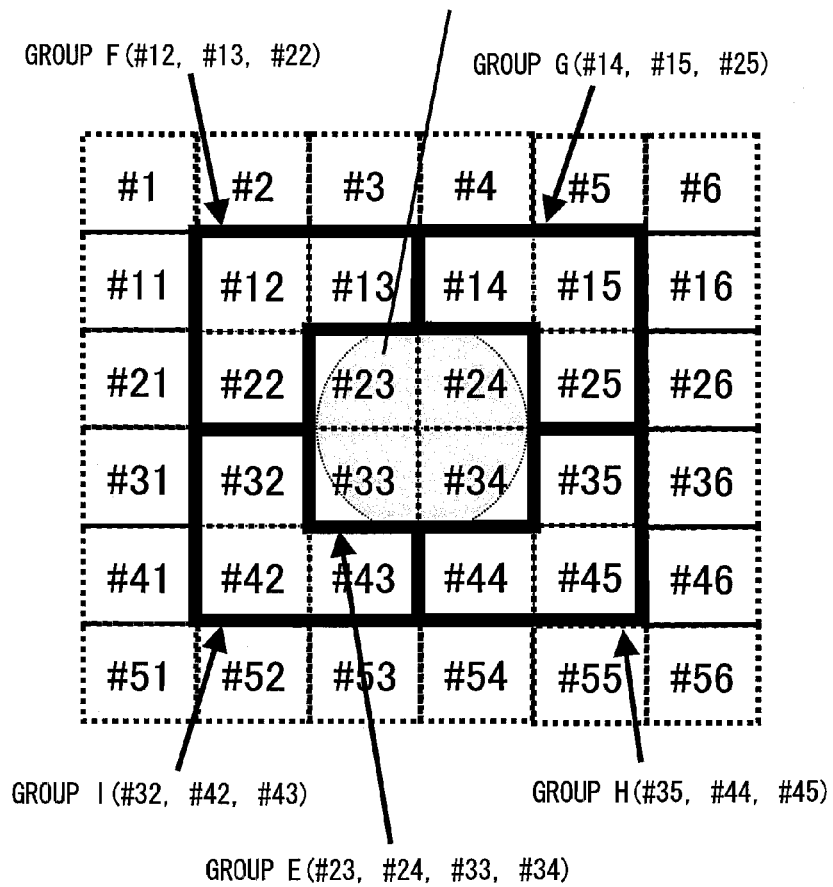
FIG. 11 shows a part of a pixel region of the image sensor 105 according to the present invention.

In the third embodiment, the transmission device 201 further includes a pilot light source, which is a light source for optical axis correction. The pilot light source may be included in the first light emission unit 203. The pilot light source irradiates the pixel region of the image sensor 105 with a pilot optical signal, which is an optical signal for optical axis correction. FIG. 11 shows a part of the pixel region of the image sensor 105. In FIG. 11, the pixels #23, #24, #33 and #34 are irradiated with a pilot optical signal as an example. As shown in FIG. 11, the classification unit 106 in the reception device 102 puts the pixels #23, #24, #33 and #34 irradiated with the pilot optical signal into one group (hereinafter, referred to as a "group E"). The classification unit 106 in the reception device 102 divides the pixels surrounding the pixels of the group E into four groups, and sets the four pixel groups as a group F (pixels #12, #13, #22), a group G (pixels #14, #15, #25), a group H (pixels #35, #44, #45), and a group I (pixels #32, #42, #43). The pixels of the groups F through I are for detecting a shift of the optical axis.

The classification unit 106 in the reception device 102 periodically reads the signals of the pixels of the groups F through I on a group-by-group basis. Thus, the classification unit 106 in the reception device 102 can periodically detect a change of the signal level of the pixels of the groups F through I, and thus can detect a direction and a distance of the shift of the optical axis. For example, when the signal level of the pixels of the group F significantly increases, the classification unit 106 in the reception device 102 can detect that the optical axis is significantly shifted in the direction from the group E to the group F (see FIG. 11). Then, the control unit 108 in the reception device 102 corrects the optical axis by changing the pixels which are to receive the optical signal for data communication (see FIG. 10) in accordance with the detected shift of the optical axis. As a result, the reception device 102 can accurately receive the optical signal even when the optical axis is shifted.

As described above, according to the third embodiment, even when the positional relationship between the transmission device and the reception device is shifted in the optical space transfer apparatus according to the first or second embodiment, the shift of the optical axis is corrected and the data communication can be performed accurately.

In the above description, the reception device 102 changes the pixels which are to receive the optical signal for performing data transfer in accordance with the detected shift of the optical axis. Alternatively, the reception device 102 may move the image sensor 105 without changing the pixels which are to receive the optical signal, or may move the lens (not shown) for collecting the optical signal to the image sensor 105. Still alternatively, the transmission device 101 may move the light source(s).

In the above description, the four pixel groups for detecting the shift of the optical axis are set by dividing the pixels surrounding the pixels of the group E into four. The number of the pixel groups for detecting the shift of the optical axis, which depends on the desired precision of detecting the shift of the optical axis, may be at least two.

In the above description, the transmission device 201 includes one pilot light source. Alternatively, the transmission device 201 may include a plurality of pilot light sources. In this case, even when the reception device 102 cannot accurately receive one pilot optical signal, the reception device 102 can receive another pilot optical signal. Therefore, the correction of the shift of the optical axis can be performed more stably.

In the above description, the pilot optical signal is emitted by the pilot light source for optical axis correction provided in the transmission device 201. Alternatively, the optical signal emitted by the light source 203-1 or the like (see FIG. 8) for data transfer may also be used as the pilot optical signal without providing any pilot light source for optical axis correction. A light modulation system generally used for data transfer is OOK (ON/OFF Keying). Therefore, in a period in which no transfer data is present, the light emission power of the light source 203-1 or the like for data transfer is 0. In this case, the reception device 102 cannot obtain any optical signal for optical axis correction. Accordingly, in the case where the optical signal emitted by the light source 203-1 or the like for data transfer is also used as the pilot optical signal, it is desired that modulation is performed such that the light source emits light even when, for example, there is no transfer data.

Figure 12:
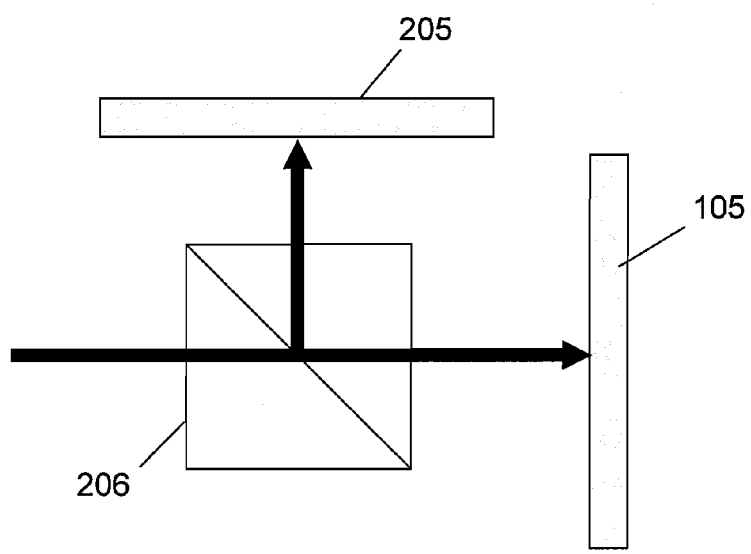
FIG. 12 shows an example of a structure of a reception device 102 in the state of including an image sensor dedicated for detecting a pilot/data transfer optical signal.
Figure 13:
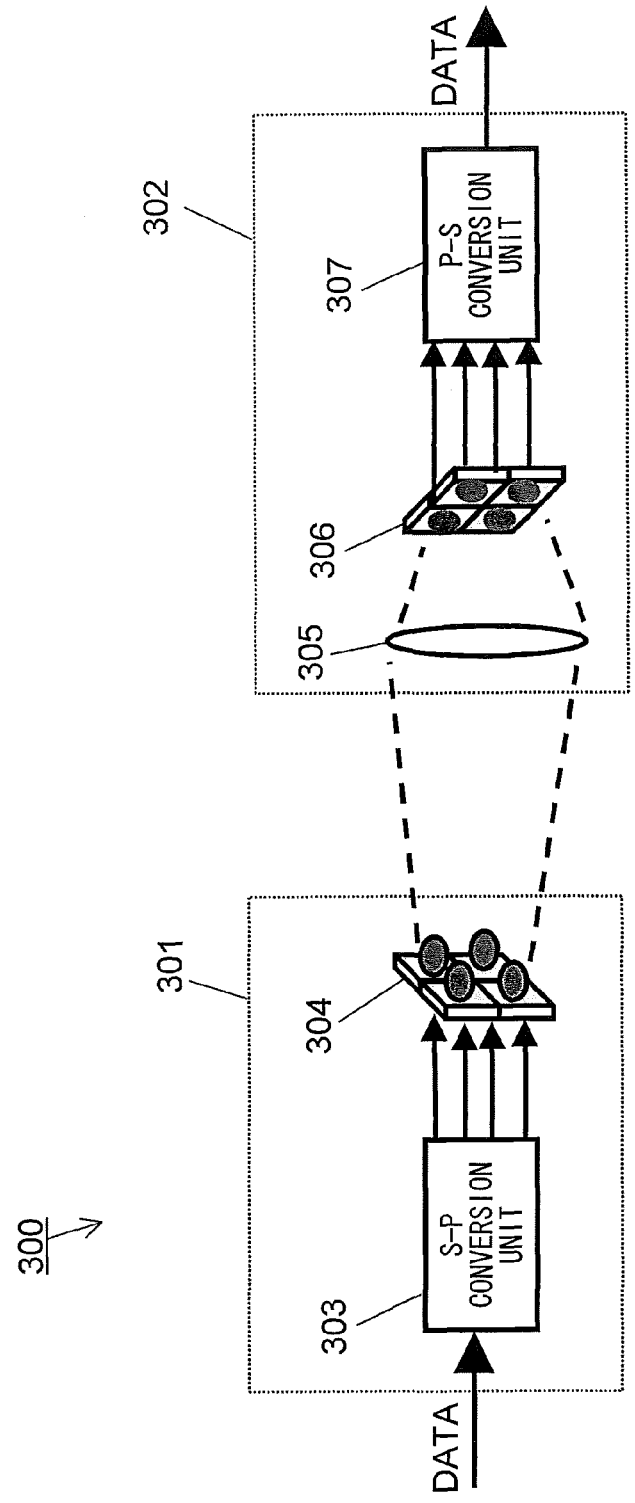
FIG. 13 shows a structure of a conventional optical space transfer apparatus 300 described in Patent Document 1.
Figure 14:
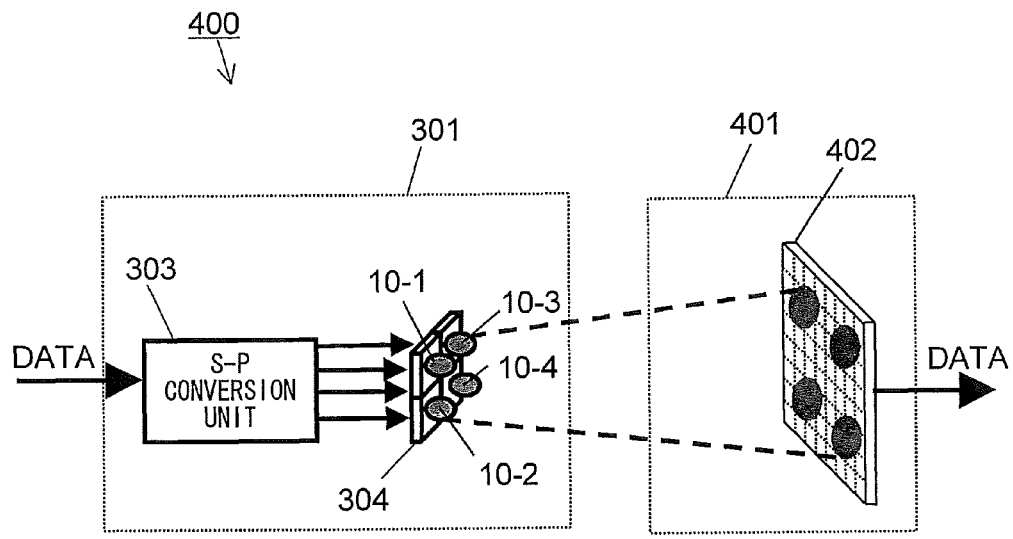
FIG. 14 shows a structure of a conventional optical space transfer apparatus 400.
Figure 15:
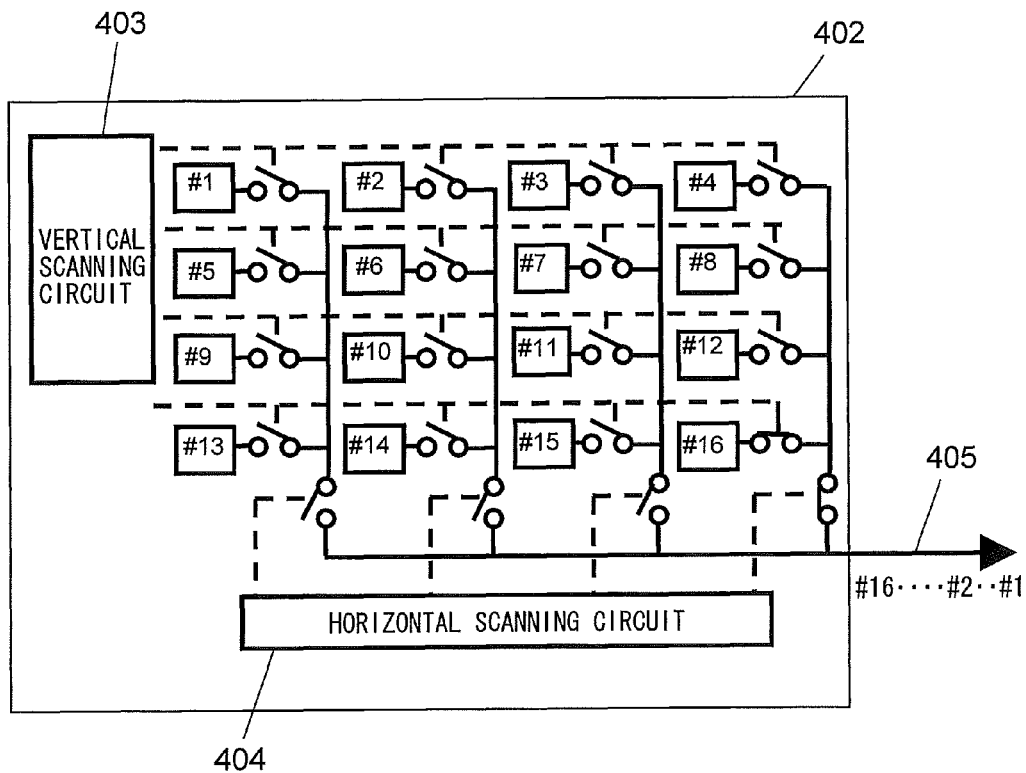
FIG. 15 illustrates an operation of an image sensor 402 of the conventional optical space transfer apparatus 400 for reading a signal of each pixel.

The reception device 102 may include an image sensor dedicated for detecting an optical signal also usable as a pilot optical signal (hereinafter, referred to as a "pilot/data transfer optical signal") (hereinafter, the above-mentioned dedicated image sensor will be referred to as an "optical axis correcting image sensor"). The optical axis correcting image sensor is not limited to an X-Y address system image sensor. FIG. 12 shows an example of a structure of the reception device 102 in the state of including an optical axis correcting image sensor. As shown in FIG. 12, the reception device 102 includes an optical axis correcting image sensor 205 and a beam splitter 206 for dividing an input pilot/data transfer optical signal and directing the resultant optical signals to irradiate the optical axis correcting image sensor 205 and the image sensor 105. Thus, the reception device 102 can, for example, while receiving a plurality of optical signals by the image sensor 105, detect one pilot/data transfer optical signal by the optical axis correcting image sensor 205. In this manner, the reception device 102 can rapidly read the pilot/data transfer optical signal by the optical axis correcting image sensor 205 without waiting for the plurality of optical signals to be read. As a result, high speed optical axis correction is made possible.

The present invention is usable for an optical space transfer apparatus or the like for alleviating the required degree of precision of optical axis adjustment using an image sensor, and is especially useful for, for example, realizing high speed communication by improving the speed of data reading from the image sensor.

The invention claimed is:

1. An optical space transfer apparatus, comprising:
a transmission device; and
a reception device, the optical space transfer apparatus transferring an optical signal from the transmission device to the reception device, wherein:
the transmission device includes a first light emission unit having a light source for emitting an optical signal; and
the reception unit includes:
an X-Y address system image sensor, having a pixel region including a plurality of pixels, for receiving the optical signal via the pixel region;
a classification unit for creating classification information for classifying, from among the plurality of pixels, a pixel group consisting of pixels that are irradiated with the optical signal, and the pixel group being less than all of the plurality of pixels; and
a control unit for controlling the X-Y address system image sensor in accordance with the classification information to simultaneously read signals of the pixels belonging to the pixel group.

2. The optical transfer apparatus according to claim 1, wherein:
the first light emission unit allows the light source to emit light to emit a setting optical signal for performing an initial setting, before starting emission of the optical signal;
the X-Y address system image sensor receives the setting optical signal via the pixel region; and
the classification unit extracts and places pixels, among the plurality of pixels, having a receiving level of the setting optical signal equal to or higher than a predetermined threshold value into a pixel group to create the classification information.

3. The optical transfer apparatus according to claim 1, wherein the control unit does not read a signal of a pixel, among the plurality of pixels, other than the pixels of the pixel group.

4. The optical transfer apparatus according to claim 1, wherein:
the reception device further includes a storage unit for storing the classification information, and
the control unit reads the classification information stored in the storage unit to control the X-Y address system image sensor.

5. The optical transfer apparatus according to claim 4, wherein:
the reception unit further includes a transmission unit for transmitting a signal requesting the transmission device for transfer of data; and
the transmission device further includes a reception unit for receiving the signal, requesting for transfer of the data, which is sent from the transmission unit.

6. The optical transfer apparatus according to claim 5, wherein:
the transmission unit is a second light emission unit for emitting an optical signal requesting the transmission device for transfer of the data; and
the second light emission unit emits the optical signal requesting for transfer of the data at a predetermined timing at which the storage unit completes storage of the classification information.

7. The optical transfer apparatus according to claim 6, wherein:
the reception unit is a light reception unit for receiving the optical signal, requesting for transfer of the data, which is emitted from the second light emission unit and converting the optical signal into an electric signal; and
the first light emission unit obtains the electric signal input thereto from the light reception unit and starts emitting the optical signal.

8. The optical transfer apparatus according to claim 1, wherein:
the first light emission unit further includes a pilot light source for emitting a pilot optical signal for correcting an optical axis shift;
the X-Y address system image sensor further receives the pilot optical signal via the pixel region;
the classification unit further detects a positional change of pixels, among the plurality of pixels, which are irradiated with the pilot optical signal; and the control unit further corrects the optical axis shift in accordance with the positional change.

9. The optical transfer apparatus according to claim 1, wherein:
the classification unit further detects a positional change of pixels irradiated with the optical signal; and
the control unit further corrects an optical axis shift in accordance with the positional change.

10. The optical transfer apparatus according to claim 1, wherein:
the reception device further includes:
a correcting image sensor for correcting an optical axis shift, and
a beam splitter for dividing the optical signal so as to be directed to irradiate the correcting image sensor and the X-Y address system image sensor;
the correcting image sensor receives the optical signal by a pixel region including a plurality of pixels;
the classification unit further detects a positional change of pixels, of the correcting image sensor, which are irradiated with the optical signal; and
the control unit further corrects the optical axis shift in accordance with the positional change.

11. An optical space transfer apparatus, comprising:
a transmission device; and
a reception device, the optical space transfer apparatus transferring an optical signal from the transmission device to the reception device, wherein:
the transmission device includes a first light emission unit having a plurality of light sources for emitting a plurality of optical signals; and
the reception unit includes:
an X-Y address system image sensor, having a pixel region including a plurality of pixels, for receiving the plurality of optical signals via the pixel region;
a classification unit for creating classification information for classifying, from among the plurality of pixels, a plurality of pixel groups corresponding to the plurality of optical signals, each pixel group consisting of pixels that are irradiated with each of the plurality of optical signals, and each pixel group being less than all of the plurality of pixels; and
a control unit for controlling the X-Y address system image sensor in accordance with the classification information to simultaneously read signals of the pixels belonging to the plurality of pixel groups on a group-by-group basis.

12. The optical transfer apparatus according to claim 11, wherein:
the first light emission unit allows the plurality of light sources to sequentially emit light to sequentially emit a plurality of setting optical signals for performing an initial setting, before starting emission of the plurality of optical signals;
the X-Y address system image sensor sequentially receives the plurality of setting optical signals via the pixel region; and
each time when one of the plurality of setting optical signals emitted sequentially is received, the classification unit extracts and places pixels, among the plurality of pixels, having a receiving level equal to or higher than a predetermined threshold value into one pixel group to create the classification information.

13. The optical transfer apparatus according to claim 12, wherein:
the first light emission unit further allows all the plurality of light sources to simultaneously emit light to simultaneously emit a plurality of pixel-limiting setting optical signals, before sequentially emitting the plurality of setting optical signals; and
the classification unit creates the classification information only for the pixels which have received the plurality of pixel-limiting setting optical signals.

14. The optical transfer apparatus according to claim 11, wherein:
the first light emission unit allows the plurality of light sources to simultaneously emit light at different light intensities to simultaneously emit a plurality of setting optical signals for performing an initial setting, before starting emission of the plurality of optical signals;
the X-Y address system image sensor simultaneously receives the plurality of setting optical signals via the pixel region; and
the classification unit places pixels which have received the plurality of setting optical signals into pixel groups in accordance with receiving levels thereof to create the classification information.

15. The optical transfer apparatus according to claim 11, wherein:
the first light emission unit allows light sources included in a plurality of light source groups, obtained by dividing the plurality of light sources, to simultaneously emit light at different light intensities on a light source group-by-light source group basis to simultaneously emit a plurality of setting optical signals for performing an initial setting on a light source group-by-light source group basis, before starting emission of the plurality of optical signals;
the X-Y address system image sensor simultaneously receives the plurality of setting optical signals from the light source groups via the pixel region on a light source group-by-light source group basis; and
each time when the plurality of setting optical signals from the light source groups are received on a light source group-by-light source group basis, the classification unit places pixels which have received the plurality of setting optical signals into pixel groups in accordance with receiving levels thereof to create the classification information.

16. The optical transfer apparatus according to claim 15, wherein:
the first light emission unit further allows all the plurality of light sources to simultaneously emit light to simultaneously emit a plurality of pixel-limiting setting optical signals, before simultaneously emitting the plurality of setting optical signals on a light source group-by-light source group basis; and
the classification unit creates the classification information only for the pixels which have received the plurality of pixel-limiting setting optical signals.

17. The optical transfer apparatus according to claim 11, wherein the control unit does not read a signal of a pixel, among the plurality of pixels, other than the pixels of the plurality of pixel groups.

18. The optical transfer apparatus according to claim 11, wherein:
the reception device further includes a storage unit for storing the classification information, and
the control unit reads the classification information stored in the storage unit to control the X-Y address system image sensor.

19. The optical transfer apparatus according to claim 18, wherein:
- the reception unit further includes a transmission unit for transmitting a signal requesting the transmission device for transfer of data; and
- the transmission device further includes a reception unit for receiving the signal, requesting for transfer of the data, which is sent from the transmission unit.

20. The optical transfer apparatus according to claim 19, wherein:
- the transmission unit is a second light emission unit for emitting an optical signal requesting the transmission device for transfer of the data; and
- the second light emission unit emits the optical signal requesting for transfer of the data at a predetermined timing at which the storage unit completes storage of the classification information.

21. The optical transfer apparatus according to claim 20, wherein:
- the reception unit is a light reception unit for receiving the optical signal, requesting for transfer of the data, which is emitted from the second light emission unit and converting the optical signal into an electric signal; and
- the first light emission unit obtains the electric signal input thereto from the light reception unit and starts emitting the optical signal.

22. The optical transfer apparatus according to claim 11, wherein:
- the first light emission unit further includes a pilot light source for emitting a pilot optical signal for correcting an optical axis shift;
- the X-Y address system image sensor further receives the pilot optical signal via the pixel region;
- the classification unit further detects a positional change of pixels, among the plurality of pixels, which are irradiated with the pilot optical signal; and
- the control unit further corrects the optical axis shift in accordance with the positional change.

23. The optical transfer apparatus according to claim 11, wherein:
- the classification unit further detects a positional change of pixels irradiated with at least one of the plurality of optical signals; and
- the control unit further corrects an optical axis shift in accordance with the positional change.

24. The optical transfer apparatus according to claim 11, wherein:
- the reception device further includes:
  - a correcting image sensor for correcting an optical axis shift, and
  - a beam splitter for dividing at least one of the plurality of optical signals so as to be directed to irradiate the correcting image sensor and the X-Y address system image sensor;
- the correcting image sensor receives the at least one of the plurality of optical signals by a pixel region including a plurality of pixels;
- the classification unit further detects a positional change of pixels, of the correcting image sensor, which are irradiated with the at least one of the plurality of optical signals; and
- the control unit further corrects the optical axis shift in accordance with the positional change.

* * * * *